（12）United States Patent
Kadomi et al.

(10) Patent No.: US 9,436,033 B2
(45) Date of Patent: Sep. 6, 2016

(54) LIQUID-CRYSTAL LENS

(71) Applicant: NIPPON ELECTRIC GLASS CO., LTD., Otsu-shi, Shiga (JP)

(72) Inventors: Masaaki Kadomi, Otsu (JP); Hirokazu Tanaka, Otsu (JP); Masanori Wada, Otsu (JP); Takashi Akimoto, Nagahama (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/379,017

(22) PCT Filed: Feb. 4, 2013

(86) PCT No.: PCT/JP2013/052478
§ 371 (c)(1),
(2) Date: Aug. 15, 2014

(87) PCT Pub. No.: WO2013/140870
PCT Pub. Date: Sep. 26, 2013

(65) Prior Publication Data
US 2015/0036096 A1    Feb. 5, 2015

(30) Foreign Application Priority Data
Mar. 19, 2012 (JP) .................................. 2012-062197

(51) Int. Cl.
*G02F 1/1335* (2006.01)
*G02F 1/29* (2006.01)

(52) U.S. Cl.
CPC ........... *G02F 1/133526* (2013.01); *G02F 1/29* (2013.01); *G02F 2001/294* (2013.01); *G02F 2201/12* (2013.01); *G02F 2203/28* (2013.01)

(58) Field of Classification Search
CPC ............... G02F 1/13; G02F 1/133526; G02F 2203/28; G02F 2201/12
See application file for complete search history.

(56) References Cited

U.S. PATENT DOCUMENTS

2007/0024801 A1    2/2007  Horiuchi et al.
2008/0151168 A1*   6/2008  Sekiguchi ............... G02B 3/14
                                                  349/142

FOREIGN PATENT DOCUMENTS

CN          1936625 A      3/2007
JP       2003-029001 A     1/2003
(Continued)

OTHER PUBLICATIONS

Official Communication issued in International Patent Application No. PCT/JP2013/052478, mailed on Apr. 2, 2013.
(Continued)

*Primary Examiner* — James Dudek
(74) *Attorney, Agent, or Firm* — Keating and Bennett, LLP

(57) ABSTRACT

Provided is a liquid-crystal lens with low wavefront aberration. A liquid-crystal lens (1) includes a liquid crystal layer (11), a first electrode (21), a second electrode (22), and a high-resistivity layer (41). The first electrode (21) includes: a first electrode portion (21*a*) including a circular opening (21*a*1) and a communicating cutout (21*a*2) formed therein, the communicating cutout (21*a*2) allowing the circular opening (21*a*1) to communicate with the outside; and a second electrode portion (21*b*) including a circular main electrode portion (21*b*1) disposed within the opening (21*a*1) and a leading electrode portion (21*b*2) connected to the main electrode portion (21*b*1) and disposed within the communicating cutout (21*a*2). The second electrode (22) faces the first electrode (21) with the liquid crystal layer (11) in between. The high-resistivity layer (41) is disposed between at least the second electrode portion (21*b*) of the first electrode (21) and the liquid crystal layer (11). The high-resistivity layer (41) has a shape rotationally symmetric about a central axis of the main electrode portion (21*b*1).

2 Claims, 1 Drawing Sheet

(56) References Cited

FOREIGN PATENT DOCUMENTS

| JP | 2009-157145 A | 7/2009 |
| JP | 2011-017742 A | 1/2011 |
| JP | 2011-180373 A | 9/2011 |

OTHER PUBLICATIONS

Official Communication issued in corresponding Chinese Patent Application No. 201380010377.9, mailed on Jan. 29, 2016.

* cited by examiner

LIQUID-CRYSTAL LENS

TECHNICAL FIELD

This invention relates to liquid-crystal lenses.

BACKGROUND ART

Liquid-crystal lenses with variable refractive index have heretofore been proposed. Liquid-crystal lenses are being demanded to decrease the drive voltage. In view of this, for example, Patent Literature 1 proposes a liquid-crystal lens in which a transparent insulating layer is interposed between an electrode and a liquid crystal layer and a high-resistivity layer is disposed on a surface of the transparent insulating layer facing the liquid crystal layer. With the provision of a high-resistivity layer as described in Patent Literature 1, the drive voltage of the liquid-crystal lens can be decreased.

CITATION LIST

Patent Literature

Patent Literature 1: JP-A-2011-17742

SUMMARY OF INVENTION

Technical Problem

Recently, there are increasing demands to make the wavefront aberration of liquid-crystal lenses low.

A principal object of the present invention is to provide a liquid-crystal lens with low wavefront aberration.

Solution to Problem

A liquid crystal lens according to the present invention includes a liquid crystal layer, a first electrode, a second electrode, and a high-resistivity layer. The first electrode includes a first electrode portion and a second electrode portion. The first electrode portion is provided with a circular opening and a communicating cutout formed therein, the communicating cutout allowing the opening to communicate with the outside. The second electrode portion includes a circular main electrode portion disposed within the opening and a leading electrode portion. The leading electrode portion is connected to the main electrode portion. The leading electrode portion is disposed within the communicating cutout. The second electrode faces the first electrode with the liquid crystal layer in between. The high-resistivity layer is interposed between at least the second electrode portion of the first electrode and the liquid crystal layer. The high-resistivity layer has a shape rotationally symmetric about a central axis of the main electrode portion.

As used in the present invention, the term "high-resistivity layer" refers to a layer whose electrical resistance is in a range from $1\times10^4$ $\Omega$/sq to $1\times10^{14}$ $\Omega$/sq at the surface.

The high-resistivity layer is preferably circular.

The high-resistivity layer preferably extends to a region where the first electrode portion is provided.

Advantageous Effects of Invention

The present invention can provide a liquid-crystal lens with low wavefront aberration.

DESCRIPTION OF EMBODIMENTS

Figure 1:
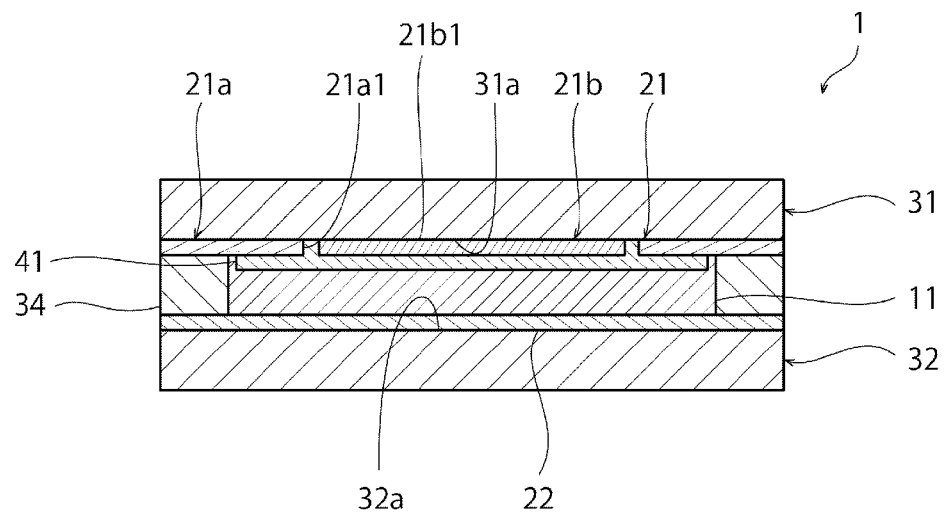
FIG. 1 is a schematic cross-sectional view of a liquid-crystal lens according to one embodiment of the present invention.

Hereinafter, a description will be given of an example of a preferred embodiment for working of the present invention. However, the following embodiment is simply illustrative. The present invention is not at all intended to be limited to the following embodiment.

Throughout the drawings to which the embodiment and the like refer, elements having substantially the same functions will be referred to by the same reference signs. The drawings to which the embodiment and the like refer are schematically illustrated, and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

FIG. 1 is a schematic cross-sectional view of a liquid-crystal lens 1 according to this embodiment. The liquid-crystal lens 1 includes a liquid crystal layer 11 containing liquid crystal molecules. The liquid crystal layer 11 is sandwiched by first and second electrodes 21, 22. The first and second electrodes 21, 22 apply voltage to the liquid crystal layer 11, so that the optical power of the liquid-crystal lens 1 changes.

More specifically, the liquid-crystal lens 1 includes a first substrate 31 and a second substrate 32 which are disposed facing at a distance from each other. A spacer member 34 is interposed between the first substrate 31 and the second substrate 32. The liquid crystal layer 11 is provided in a space defined by the spacer member 34 and the first and second substrates 31, 32. The liquid crystal layer 11 may be divided into a plurality of liquid crystal layers, such as by one or more glass sheets.

Each of the first substrate 31, the second substrate 32, and the spacer member 34 can be made of, for example, glass or so on. The thickness of the first substrate 31 and the second substrate 32 can be, for example, about 0.1 mm to about 1.0 mm. The thickness of the spacer member 34 can be appropriately selected according to the thickness of the liquid crystal layer 11 dependent on desired optical power, the response speed required for the liquid crystal layer 11 or so on. The thickness of the spacer member 34 can be, for example, about 10 μm to about 80 μm.

The first electrode 21 is disposed on a surface 31a of the first substrate 31 close to the liquid crystal layer 11. On the other hand, the second electrode 22 is disposed on a surface 32a of the second substrate 32 close to the liquid crystal layer 11. The second electrode 22 faces the first electrode 21 with the liquid crystal layer 11 in between.

The first and second electrodes 21, 22 can be made of a transparent conductive oxide, such as, for example, indium tin oxide (ITO).

Figure 2:
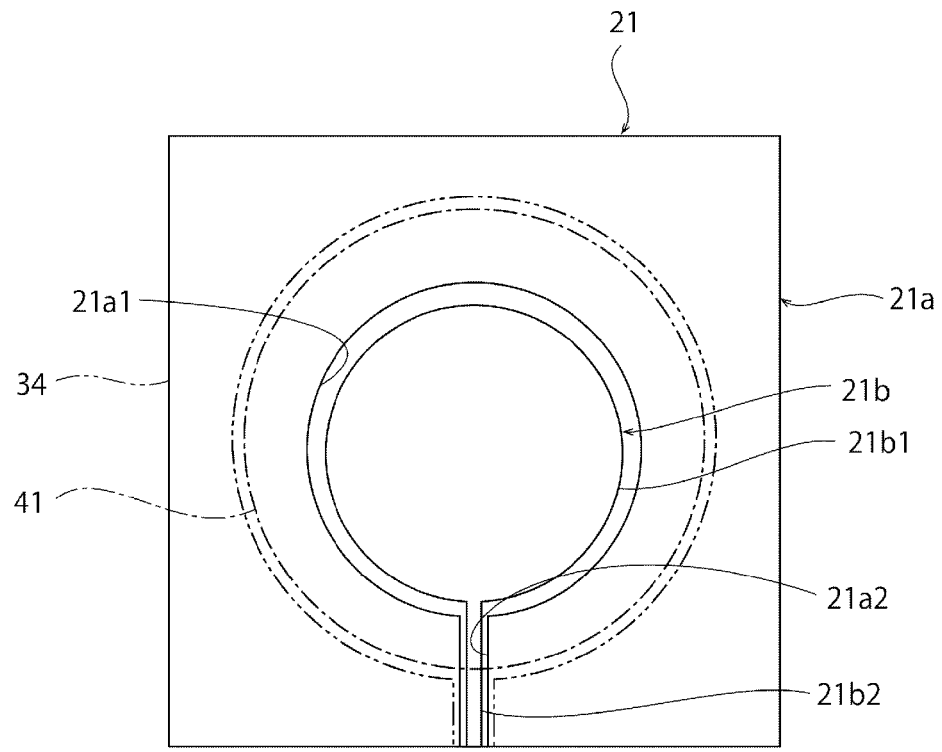
FIG. 2 is a schematic plan view of a first electrode in the one embodiment of the present invention.

The first electrode 21 includes: a first electrode portion 21a including a circular opening 21a1 and a communicating cutout 21a2 (see FIG. 2) formed therein, the communicating cutout 21a2 allowing the circular opening 21a1 to communicate with the outside; and a second electrode portion 21b including a circular main electrode portion 21b1 disposed within the opening 21a1 of the first electrode portion 21a and a leading electrode portion 21b2 connected to the main electrode portion 21b1 and disposed within the communicating cutout 21a2. In the liquid-crystal lens 1, a portion of the liquid crystal layer 11 located corresponding to a region of the main electrode portion 21b1 thus provided functions as a lens. The first electrode portion 21a and the second electrode portion 21b are electrically insulated from each other. The space between the first electrode portion 21a and the second electrode portion 21b may be hollow or may be made solid by disposing an insulator or an after-mentioned high-resistivity layer 41 therein.

The first electrode 21 may be disposed over the entire region where the liquid crystal layer 11 is provided or may be disposed on part of the region where the liquid crystal layer 11 is provided. Likewise, the second electrode 22 may be disposed over the entire region where the liquid crystal layer 11 is provided or may be disposed on part of the region where the liquid crystal layer 11 is provided.

In the liquid-crystal lens 1, a voltage V1 is applied between the first electrode portion 21a and the second electrode 22 and a voltage V2 is applied between the second electrode portion 21b and the second electrode 22. The optical power of the liquid-crystal lens 1 can be changed by changing the magnitudes of the voltage V1 and voltage V2. Normally, the second electrode 22 is set as a ground electrode with a potential of 0 V. Therefore, in this embodiment, out of the first and second electrodes 21 and 22, the electrode having a greater maximum absolute value of voltage applied thereto is the first electrode 21.

Between at least the second electrode portion 21b of the first electrode 21 and the liquid crystal layer 11, a high-resistivity layer 41 is interposed whose electrical resistance is $1 \times 10^4$ Ω/sq to $1 \times 10^{14}$ Ω/sq at the surface and higher than that of the electrode. The high-resistivity layer 41 may be disposed, for example, over the entire region where the liquid crystal layer 11 is provided or on part of the region where the liquid crystal layer 11 is provided. The high-resistivity layer 41 may be, for example, disposed on at least part of the second electrode portion 21b of the first electrode 21 or disposed not only over the second electrode portion 21b but also on at least part of the first electrode portion 21a.

The high-resistivity layer 41 preferably contains at least one of zinc oxide, aluminum zinc oxide, indium tin oxide, antimony tin oxide, gallium zinc oxide, silicon zinc oxide, tin zinc oxide, boron zinc oxide, and germanium zinc oxide.

The high-resistivity layer 41 may be composed of a single high-resistivity layer or a laminate of a plurality of high-resistivity layers. In the case where the high-resistivity layer 41 is composed of a laminate of a plurality of high-resistivity layers, the plurality of high-resistivity layers may be made of the same material or different materials.

The thickness of the high-resistivity layer 41 is preferably, for example, 10 nm to 300 nm.

Although not shown, an inorganic dielectric layer is preferably interposed between the high-resistivity layer 41 and the liquid crystal layer 11. Furthermore, an alignment film is disposed over each of the inorganic dielectric layer and the surface 32a of the second substrate 32 including a portion thereof on which the second electrode 22 is provided. These alignment films align liquid crystal molecules contained in the liquid crystal layer 11.

The high-resistivity layer 41 is disposed on at least part of the second electrode portion 21b of the first electrode 21. The high-resistivity layer 41 has a shape rotationally symmetric about a central axis of the main electrode portion 21b1 of the second electrode portion 21b. Thus, the liquid-crystal lens 1 can have low wavefront aberration. Although the reason for this is not known exactly, there is a possible reason below. Specifically, by disposing the high-resistivity layer 41 on at least part of the second electrode portion 21b of the first electrode 21, a difference occurs in way of application of electric charge between a region of the liquid crystal layer 11 where the high-resistivity layer 41 is formed and the region thereof outside. The lines of electric force generated are attracted to within the region of the liquid crystal layer 11 over which the high-resistivity layer 41 lies. Therefore, the above reason can be attributed to the fact that since the shape of the high-resistivity layer 41 is rotationally symmetric about the central axis of the main electrode portion 21b1 of the second electrode portion 21b, the lines of electric force can be attracted evenly to within the region of the liquid crystal layer 11 over which the high-resistivity layer 41 lies.

The central axis of the high-resistivity layer 41 preferably coincides with the central axis of the main electrode portion 21b1 of the second electrode portion 21b. However, if an optical axis shift occurs such as owing to an effect of the pretilt angle of the liquid crystal molecules, the central axis of the high-resistivity layer 41 may not coincide with the central axis of the main electrode portion 21b1 of the second electrode portion 21b.

Furthermore, the shape of the high-resistivity layer 41 may be any shape so long as it is rotationally symmetric about the central axis of the main electrode portion 21b1 of the second electrode portion 21b. The high-resistivity layer 41 may be, for example, polygonal, circular or so on. The high-resistivity layer 41 is preferably, among others, circular from the viewpoint of further reducing the wavefront aberration of the liquid-crystal lens 1.

From the viewpoint of increasing the diopter of the liquid-crystal lens 1, the high-resistivity layer 41 preferably extends to the first electrode portion 21a. Thus, an electric power gradient becomes likely to occur between the first electrode portion 21a and the second electrode portion 21b, so that the lines of electric force are more likely to concentrate toward the center of the portion of the liquid crystal layer 11 over which the high-resistivity layer 41 lies. Therefore, the diopter of the liquid-crystal lens 1 can be increased.

Moreover, the liquid crystal layer 11 may be divided into a plurality of sections along the thickness direction, such as, for example, by one or more glass sheets.

The liquid-crystal lens according to the present invention may include a plurality of sets of the liquid crystal layer and the first and second electrodes.

REFERENCE SIGNS LIST

1 . . . liquid-crystal lens
11 . . . liquid crystal layer
21 . . . first electrode
21a1 . . . opening
21a2 . . . communicating cutout
21a . . . first electrode portion
21b1 . . . main electrode portion
21b . . . second electrode portion
21b2 . . . leading electrode portion
22 . . . second electrode
31 . . . first substrate
31a . . . surface
32 . . . second substrate
32a . . . surface
34 . . . spacer member
41 . . . high-resistivity layer

The invention claimed is:

1. A liquid-crystal lens comprising:
a liquid crystal layer;
a first electrode including a first electrode portion and a second electrode portion, the first electrode portion including a circular main portion in which a circular opening is provided and a linear portion in which a communicating cutout is provided, the communicating cutout allowing the circular opening to communicate with the outside, the second electrode portion including a circular main electrode portion disposed within the circular opening and a leading electrode portion connected to the circular main electrode portion and disposed within the communicating cutout;
a second electrode facing the first electrode with the liquid crystal layer in between; and
a high-resistivity layer interposed between at least the second electrode portion of the first electrode and the liquid crystal layer; wherein
the high-resistivity layer has a shape rotationally symmetric about a central axis of the circular main electrode portion; and
the high-resistivity layer extends to a region where the circular main portion of the first electrode portion is provided, and the high-resistivity layer is disposed on only part of the region where the circular main portion of the first electrode portion is provided.

2. The liquid-crystal lens according to claim 1, wherein the high-resistivity layer is circular.

* * * * *